US008919947B2

(12) United States Patent
Hiraoka

(10) Patent No.: US 8,919,947 B2
(45) Date of Patent: Dec. 30, 2014

(54) PHOTOPOLYMERIZABLE INKJET INK, INK CARTRIDGE, AND INKJET PRINTING DEVICE

(71) Applicant: Takao Hiraoka, Kanagawa (JP)

(72) Inventor: Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/900,803

(22) Filed: May 23, 2013

(65) Prior Publication Data
US 2013/0321539 A1 Dec. 5, 2013

(30) Foreign Application Priority Data

May 31, 2012 (JP) ................................ 2012-124057

(51) Int. Cl.
| | | |
|---|---|---|
| *G01D 11/00* | (2006.01) | |
| *C09D 11/00* | (2014.01) | |
| *C09D 11/30* | (2014.01) | |
| *C09D 11/10* | (2014.01) | |
| *C09D 11/101* | (2014.01) | |
| *C09D 11/106* | (2014.01) | |

(52) U.S. Cl.
CPC ............... *C09D 11/30* (2013.01); *C09D 11/00* (2013.01); *C09D 11/10* (2013.01); *C09D 11/101* (2013.01); *C09D 11/106* (2013.01)
USPC ......................................... 347/100; 106/31.6

(58) Field of Classification Search
CPC .......... B41J 11/002; B41J 2/2107; B41J 2/01; B41J 2/17503; C09D 11/322; C09D 11/38; C09D 11/101
USPC .......... 347/86, 87, 95, 100; 106/31.6
See application file for complete search history.

(56) References Cited

U.S. PATENT DOCUMENTS

| 6,114,404 | A | 9/2000 | Deeken et al. |
| 7,368,485 | B2 * | 5/2008 | Noutary .......................... 522/39 |
| 2004/0145639 | A1 | 7/2004 | Noutary |
| 2011/0294993 | A1 | 12/2011 | Higashi et al. |
| 2012/0086762 | A1 | 4/2012 | Noguchi et al. |
| 2012/0147103 | A1 | 6/2012 | Hasegawa et al. |
| 2012/0176456 | A1 | 7/2012 | Maekawa et al. |
| 2012/0200648 | A1 | 8/2012 | Hiraoka et al. |
| 2012/0242768 | A1 | 9/2012 | Seno et al. |
| 2012/0293589 | A1 | 11/2012 | Hiraoka |
| 2013/0065024 | A1 | 3/2013 | Aruga et al. |

FOREIGN PATENT DOCUMENTS

| CN | 1944548 A | 4/2007 |
| CN | 102206441 A | 10/2011 |
| EP | 2 390 283 A1 | 11/2011 |
| JP | 07-010894 | 2/1995 |
| JP | 2004-526820 | 9/2004 |
| JP | 2011-207993 | 10/2011 |
| JP | 2012-251123 | 12/2012 |
| WO | WO 2012/153867 A1 | 11/2012 |

OTHER PUBLICATIONS

Extended Search Report issued Sep. 26, 2013 in European Patent Application No. 13169506.6.
Combined Office Action and Search Report issued Apr. 28, 2014 in Patent Application No. 201310208591.7 (with English translation).

* cited by examiner

*Primary Examiner* — An Do
(74) *Attorney, Agent, or Firm* — Oblon, Spivak, McClelland, Maier & Neustadt, L.L.P.

(57) ABSTRACT

To provide a photopolymerizable inkjet ink, which contains monomer components, and a polymer or a copolymer of styrene, styrene derivative, acrylic acid ester, or acrylic acid, or any combination thereof, wherein the monomer components contain: t-butyl methacrylate, n-pentyl methacrylate, or n-hexyl methacrylate, or any combination thereof; and glycerol dimethacrylate, and wherein the photopolymerizable inkjet ink is free from a diluting solvent.

8 Claims, 2 Drawing Sheets

US 8,919,947 B2

PHOTOPOLYMERIZABLE INKJET INK, INK CARTRIDGE, AND INKJET PRINTING DEVICE

BACKGROUND OF THE INVENTION

1. Field of the Invention

The present invention relates to a photopolymerizable inkjet ink, an ink cartridge housing the photopolymerizable inkjet ink, and an inkjet printing device containing the ink cartridge.

2. Description of the Related Art

Photopolymerizable inkjet inks using (meth)acrylic acid ester as a base monomer component have been widely known (see, for example, Japanese Patent Application Laid-Open (JP-A) No. 2004-526820). Moreover, it is also known in the art that various functions can be provided to a coating film by adding a polymer component to the photopolymerizable inkjet ink (see, for example, Japanese Patent Publication Application (JP-B) No. 07-010894).

One of the advantages obtained by adding the polymer component to the photopolymerizable inkjet ink is to secure sufficient adhesion of the polymerizable inkjet ink to a relatively smooth base, such as a plastic material, with which it is difficult to penetrate a liquid and secure adhesion of a coating film. When the photopolymerizable inkjet ink contains the polymer component, however, the viscosity of the ink significantly increases due to the contained polymer component. Unless a monomer having sufficiently low viscosity is used as the monomer component in the photopolymerizable inkjet ink, it is difficult to adjust the viscosity of the photopolymerizable inkjet ink containing the polymer component to the range at which the ink can be ejected.

Moreover, many of the monomer components used in conventional photopolymerizable inkjet inks are toxic. Especially, among the (meth)acrylic acid esters, which are inexpensive and readily available, most of the (meth)acrylic acid esters having sufficiently low viscosity have high toxicity in terms of skin sensitization, which causes allergy reactions with skin upon contact with such materials. Accordingly, to attain the photopolymerizable inkjet ink having no problem of skin sensitization and having viscosity low enough to eject the ink at room temperature even when a polymer component is contained is a difficult problem, and this problem has not been yet solved in the conventional art.

Note that, reduction in the viscosity of the photopolymerizable inkjet ink can be easily achieved by adding a diluting solvent, but use of the diluting solvent is not desirable considering the environment, as the diluting solvent is evaporated and released in the atmosphere. Accordingly, use of the diluting solvent in the photopolymerizable inkjet ink should be avoided. Moreover, the viscosity of the photopolymerizable inkjet ink can be also reduced by using a water-soluble monomer as the monomer component, and adding water to the ink. However, such ink cannot expect an effect of penetrating and drying as used on a base, such as the plastic material. Therefore, it is necessary to evaporate the water to dry the ink for accelerating speed of a printing process, for which equipment, such as a heat source, is generally required. Accordingly, use of such ink is not preferable in view of energy saving.

SUMMARY OF THE INVENTION

The present invention aims to solve the aforementioned various problems in the art and to achieve the following object. An object of the present invention is to provide a photopolymerizable inkjet ink, which has no problem for skin sensitization, has low viscosity at which there is no problem for ejection by inkjet, and excels in adhesion to plastic materials.

The means for solving the aforementioned problems is as follows.

A photopolymerizable inkjet ink, which contains: monomer components, and a polymer or a copolymer, wherein the monomer components contain: t-butyl methacrylate, n-pentyl methacrylate, or n-hexyl methacrylate, or any combination thereof; and glycerol dimethacrylate, wherein the polymer or the copolymer contains styrene, styrene derivative, acrylic acid ester, or acrylic acid, or any combination thereof, and wherein the photopolymerizable inkjet ink is free from a diluting solvent.

The present invention can solve the various problems in the art and can provide a photopolymerizable inkjet ink, which has no problem for skin sensitization, has low viscosity at which there is no problem for ejection by inkjet, and excels in adhesion to plastic materials.

DETAILED DESCRIPTION OF THE INVENTION

Photopolymerizable Inkjet Ink

Figure 1:
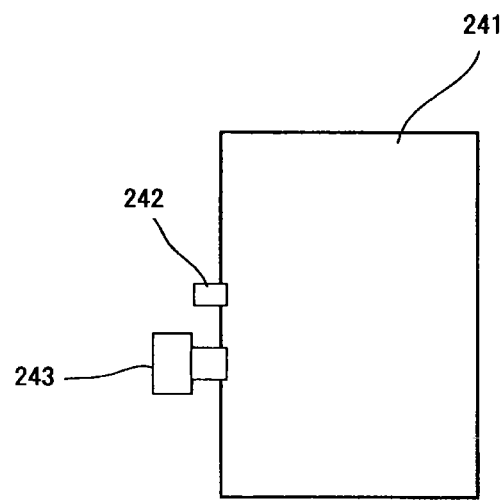
FIG. 1 is a schematic diagram illustrating one example of an ink bag of the ink cartridge of the present invention.

The photopolymerizable inkjet ink (may be referred to as an "ink" hereinafter) of the present invention contains monomer components, and a polymer or a copolymer, and may further contain other components, if necessary. The photopolymerizable inkjet ink is free from a diluting solvent.

<Monomer Components>

The monomer components contain t-butyl methacrylate, n-pentyl methacrylate, or n-hexyl methacrylate, or any combination thereof, and glycerol dimethacrylate, and may further contain other monomer components, if necessary.

<<t-Butyl Methacrylate, n-Pentyl Methacrylate, n-Hexyl Methacrylate>>

The t-butyl methacrylate, n-pentyl methacrylate, and n-hexyl methacrylate, which are photopolymerizable monomers (may referred to as a "monomer component" hereinafter) that are negative for skin sensitization, inexpensive and readily available, have low viscosity per se, i.e., about 1 mPa·s to about 2 mPa·s at 25° C., and are an essential component for lowering the viscosity of the ink to a range at which the ink can be ejected by inkjet. Use of these photopolymerizable monomers allows to maintain the viscosity of the ink sufficiently low even when the ink contains a polymer component.

An amount of the t-butyl methacrylate, the n-pentyl methacrylate, or the n-hexyl methacrylate or any combination thereof is appropriately selected depending on the intended purpose without any limitation, but the amount thereof is preferably 20 parts by mass to 85 parts by mass, more preferably 40 parts by mass to 85 parts by mass, when a total amount of the monomer components is 100 parts by mass.

<<Glycerol Dimethacrylate>>

However, sufficient curing properties of the ink cannot be attained when only the aforementioned three photopolymerizable monomers are used. Accordingly, the glycerol dimethacrylate, which is another photopolymerizable monomer that is negative for skin sensitization, inexpensive, and readily available, is contained in the ink so that practical curing properties of the ink can be attained.

An amount of the glycerol dimethacrylate is appropriately selected depending on the intended purpose without any limitation, and the amount thereof is preferably 10 parts by mass to 60 parts by mass, when a total amount of the monomer components is 100 parts by mass.

<<Other Monomer Components>>

Other monomer components are appropriately selected depending on the intended purpose without any limitation, and examples thereof include tricyclodecane dimethanol dimethacrylate, isostearyl acrylate, stearyl methacrylate, ethylene oxide-modified phenol acrylate, and other photopolymerizable monomers.

—Tricyclodecane Dimethanol Dimethacrylate, Isostearyl Acrylate, Stearyl Methacrylate, Ethylene Oxide-Modified Phenol Acrylate—

Use of the tricyclodecane dimethanol dimethacrylate, which is a photopolymerizable monomer that is negative for skin sensitization, inexpensive, and readily available, in combination with the aforementioned monomer components is preferable, as strength of a resulting coating film is improved.

An amount of the tricyclodecane dimethanol dimethacrylate is appropriately selected depending on the intended purpose without any limitation, and the amount thereof is preferably 0 parts by mass to 20 parts by mass, when a total amount of the monomer components is 100 parts by mass.

Moreover, use of the isostearyl acrylate, the stearyl methacrylate, or the ethylene oxide-modified phenol acrylate, or any combination thereof, which is a photopolymerizable monomer that is negative for skin sensitization, inexpensive, and readily available, in combination with the aforementioned monomer components is preferable, as flexibility of a resulting coating film is improved.

An amount of the isostearyl acrylate, the stearyl methacrylate, or the ethylene oxide-modified phenol acrylate, or any combination thereof is appropriately selected depending on the intended purpose without any limitation, but the amount thereof is preferably 0 parts by mass to 10 parts by mass, when a total amount of the monomer components is 100 parts by mass.

The photopolymerizable monomer negative for skin sensitization refers to a compound that satisfies at least one of the following (1) to (3):

(1) a compound having a Stimulation Index (SI value) of less than 3, where the Stimulation Index indicates the level of sensitization as measured by a skin sensitization test based on the LLNA (Local Lymph Node Assay);

(2) a compound evaluated as "negative for skin sensitization" or "no skin sensitization" in its MSDS (Material Safety Data Sheet); and (3) a compound evaluated as "negative for skin sensitization" or "without skin sensitization" in literature [e.g., Contact Dermatitis 8 223-235 (1982)].

Regarding the above (1), the compound having the SI value of less than 3 is considered as negative for skin sensitization as described in literatures, for example, "Functional Material" (Kino Zairyou) 2005, September, Vol. 25, No. 9, p. 55. The lower SI value means the lower level of skin sensitization. Thus, in the present invention, a monomer having the lower SI value is preferably used. The SI value of the monomer used is preferably less than 3, more preferably 2 or lower, and even more preferably 1.6 or lower.

—Other Photopolymerizable Monomers—

In addition to the photopolymerizable monomers negative for skin sensitization, the following (meth)acrylates, (meth)acryl amides, and vinyl ethers can be used as other photopolymerizable monomers, as long as a resulting ink does not have a problem, even through they have a problem of skin sensitization in some degrees when used alone, or skin sensitization thereof is not confirmed.

Examples of the (meth)acrylate, the (meth)acryl amide, and the vinyl ether include ethylene glycol di(meth)acrylate, hydroxypivalic acid neopentyl glycol di(meth)acrylate, γ-butyrolactone acrylate, isobornyl(meth)acrylate, formulated trimethylol propane mono(meth)acrylate, polytetramethylene glycol di(meth)acrylate, trimethylol propane(meth)acrylic acid benzoate, diethylene glycol diacrylate, triethylene glycol diacrylate, tetraethylene glycol diacrylate, polyethylene glycol diacrylate [$CH_2$=CH—CO($OC_2H_4$)$_n$—OCOCH=$CH_2$ (n≈9)], [$CH_2$=CH—CO($OC_2H_4$)$_n$—OCOCH=$CH_2$ (n≈14)], [$CH_2$=CH—CO($OC_2H_4$)$_n$—OCOCH=$CH_2$ (n≈23)], dipropylene glycol di(meth)acrylate, tripropylene glycol di(meth)acrylate, polypropylene glycol dimethacrylate [$CH_2$=C($CH_3$)—CO—($OC_3H_6$)$_n$—OCOC($CH_3$)=$CH_2$ (n≈7)], 1,3-butanediol diacrylate, 1,4-butanediol di(meth)acrylate, 1,6-hexanediol di(meth)acrylate, 1,9-nonanediol di(meth)acrylate, neopentyl glycol di(meth)acrylate, tricyclodecane dimethanol diacrylate, propylene oxide-modified bisphenol A di(meth)acrylate, polyethylene glycol di(meth)acrylate, dipentaerythritol hexa(meth)acrylate, (meth)acryloyl morpholine, 2-hydroxypropyl(meth)acryl amide, propylene oxide-modified tetramethylol methane tetra(meth)acrylate, dipentaerythritol hydroxypenta(meth)acrylate, caprolactone-modified dipentaerythritol hydroxypenta(meth)acrylate, ditrimethylol propane tetra(meth)acrylate, pentaerythritol tetra(meth)acrylate, trimethylol propane acrylate, ethylene oxide-modified trimethylol propane triacrylate, propylene oxide-modified trimethylol propane tri(meth)acrylate, caprolactone-modified trimethylol propane tri(meth)acrylate, pentaerythritol tri(meth)acrylate, tris(2-hydroxyethyl)isocyanurate tri(meth)acrylate, ethoxylated neopentyl glycol di(meth)acrylate, propylene oxide-modified neopentyl glycol di(meth)acrylate, propylene oxide-modified glyceryl tri(meth)acrylate, polyester di(meth)acrylate, polyester tri(meth)acrylate, polyester tetra(meth)acrylate, polyester penta(meth)acrylate, polyester poly(meth)acrylate, N-vinyl caprolactam, N-vinyl pyrrolidone, N-vinyl formamide, polyurethane di(meth)acrylate, polyurethane tri(meth)acrylate, polyurethane tetra(meth)acrylate, polyurethane penta(meth)acrylate, polyurethane poly(meth)acrylate, triethylene glycol divinyl ether, cyclohexane dimethanol divinyl ether, cyclohexane dimethanol monovinyl ether, hydroxyethyl vinyl ether, diethylene glycol monovinyl ether, diethylene glycol divinyl ether, dicyclopentadiene vinyl ether, tricyclodecane vinyl ether, benzyl vinyl ether, ethyloxtacene methyl vinyl ether, triethylene glycol divinyl ether, hydroxybutyl vinyl ether, and ethyl vinyl ether. These may be used alone, or in combination.

Amounts of the aforementioned other photopolymerizable monomers are appropriately selected depending on the intended purpose without any limitation.

<Polymer or Copolymer>

The polymer or copolymer is a polymer or copolymer of styrene, styrene derivative, acrylic acid, or acrylic acid ester, or any combination thereof.

The ink contains the polymer or the copolymer as the polymer component. As a result, excellent adhesion of the ink to the plastic film can be attained. Note that, the polymer component is hardly passed through a skin, as it has a high molecular weight, and thus the polymer component does not generally have a problem of skin sensitization.

The polymer component desirably has excellent dissolubility of the monomer components. Therefore, a polymer or copolymer having a crosslink structure is not suitable, and a chain-polymer or copolymer is preferable as the polymer component. Moreover, a polymer or copolymer having an excessively large molecular weight is not preferable even through it has a chain structure, because workability is significantly impaired when the polymer component is dissolved in the ink. Accordingly, the mass average molecular weight of a polymer or copolymer used as the polymer component is preferably smaller than 100,000. Further, it is also important that a polymer or copolymer is not so rigid, and crystallinity thereof is not so high, in view of solubility. In addition, in view of practical use, it is also important that it is inexpensive and readily available. In view of the above-described points, a type of the polymer or copolymer used as the polymer component is preferably a polymer or copolymer of the styrene, the styrene derivative, the acrylic acid, or acrylic acid ester, or any combination thereof. A polymer containing a vinyl-based monomer, acryl amide, or derivative thereof, polyurethane, or polyester may also be used. Considering that the polymer or copolymer of low molecular weight is preferable as described above, however, a polymer having the higher glass transition temperature is more preferable, because such polymer does not tend to cause tackiness on a surface of a cured coating film of a resulting ink, assuming a situation that the print coated ink is laminated. Accordingly, the aforementioned polymer or copolymer is preferable. Note that, the monomer components, i.e., the t-butyl methacrylate, the n-pentyl methacrylate, and the n-hexyl methacrylate, have high hydrophobicity, and thus it is preferred that the polymer component do not contain an excessively large amount of polar groups in view of dissolubility. Accordingly, the acid value of the polymer component is preferably 108 mgKOH/g or lower, as described in Examples below.

An amount of the polymer or the copolymer is appropriately selected depending on the intended purpose without any limitation, and the amount thereof is preferably 5 parts by mass to 20 parts by mass, when a total amount of the monomer components is 100 parts by mass.

<Other Components>

The aforementioned other components are appropriately selected depending on the intended purpose without any limitation, and examples thereof include a photoradical polymerization initiator, a polymerization accelerator, and a colorant.

<<Photoradical Polymerization Initiator>>

The ink of the present invention may contain a photoradical polymerization initiator. As for the photoradical polymerization initiator, a photoradical polymerization initiator that is negative for skin sensitization is preferably used.

The (meth)acrylic acid ester, the (meth)acryl amide, derivatives thereof, and the vinyl ether are known to have cationic polymerization property as well. Photocationic polymerization initiators are generally expensive and generate a slight amount of strong acid or strong alkali even in the state where they are not irradiated with light. Thus, it is necessary to take special cares such as imparting acid resistance and alkali resistance to an ink supply channel of an inkjet coating system, imposing limitation on the choice of members constituting the inkjet coating system.

In contrast, the ink of the present invention can use a photoradical polymerization initiator that is inexpensive and generates no strong acid or strong alkali. Thus, it is possible to produce an ink at low cost, and also it is easy to choose members of an inkjet coating system. Needless to say, when using a quite high energy light source, such as electron beams, α rays, β rays, γ rays or X rays, polymerization reaction can proceed without polymerization initiator. This is a conventionally known matter, and not described in detail in the present invention.

The photoradical polymerization initiator is appropriately selected depending on the intended purpose without any limitation, and examples thereof include a self-cleaving photopolymerization initiator and a hydrogen-abstracting polymerization initiator. These may be used alone, or in combination.

Examples of the self-cleaving photopolymerization initiator include 2,2-dimethoxyl, 2-diphenylethan-1-one, 1-hydroxy-cyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methylpropionyl)benzyl]phenyl}-2-methyl-1-propan-1-one, phenylglyoxylic acid methyl ester, 2-methyl-1-[4-(methylthio)phenyl]-2-morpholinopropan-1-one, 2-benzyl-2-dimethylamino-1-(4-morpholinophenyl)-butanone-1,2-dimethylamino-2-(4-methylbenzyl)-1-(4-morpholin-4-yl-phenyl)butan-1-one, bis(2,4,6-trimethylbenzoyl)phenyl phosphine oxide, bis(2,6-dimethoxybenzoyl)-2,4,4-trimethyl-pentylphosphine oxide, 2,4,6-trimethylbenzoylphosphine oxide, 1,2-octanedion-[4-(phenylthio)-2-(o-benzoyloxime)], ethanone-1-[9-ethyl-6-(2-methylbenzoyl)-9H-carbazol-3-yl]-1-(O-acetyloxime) and [4-(methylphenylthio)phenyl]phenylmethanone.

Examples of the hydrogen-abstracting polymerization initiator include: benzophenone compounds such as benzophenone, methylbenzophenone, methyl-2-benzoylbenzoate, 4-benzoyl-4'-methyldiphenyl sulfide and phenylbenzophenone; and thioxanthone compounds such as 2,4-diethylthioxanthone, 2-chlorothioxanthone, isopropylthioxanthone and 1-chloro-4-propylthioxanthone.

<<Polymerization Accelerator>>

Moreover, the ink of the present invention may contain amine as a polymerization initiator, in combination with the photoradical polymerization initiator.

The polymerization accelerator is appropriately selected depending on the intended purpose without any limitation, and examples thereof include p-dimethylaminobenzoate, 2-ethylhexyl p-dimethylaminobenzoate, methyl p-dimethylaminobenzoate, 2-dimethylaminoethyl benzoate and butoxyethyl p-dimethylaminobenzoate. These may be used alone, or in combination.

For example, when the t-butyl methacrylate, the n-pentyl methacrylate, and the n-hexyl methacrylate is determined as a compound group (A); the glycerol dimethacrylate is determined as a compound (B); the tricyclodecane dimethanol dimethacrylate is determined as a compound (C); the isostearyl acrylate, the stearyl methacrylate, and the ethylene oxide-modified phenol acrylate, which are photopolymerizable monomers that are negative for skin sensitization, inexpensive, and readily available, are determined as a compound group (D); an equimolar mixture of a polymerization initiator that is negative for skin sensitization, inexpensive, and readily available (i.e., the 1-hydroxy-cyclohexylphenylketone, the 2-dimethylamino-2-(4-methylbenzoyl)-1-(4-morpholin-4-yl-phenyl)butan-1-one, and the 2,4-diethylthioxanthone) and a polymerization accelerator (i.e., the 2-ethylhexyl p-dimethylbenzoate) was determined as a compound group (E); the polymer or copolymer, which is a polymer component, is determined as a compound group (F); and a total amount of the monomer components is 100 parts by mass, an amount of the compound group (A) is preferably 40 parts by mass to 85 parts by mass, an amount of the compound (B) is preferably 10 parts by mass to 60 parts by mass, an amount of the compound (C) is preferably 0 parts by mass to 20 parts by mass, and an amount of the compound group (D) is preferably 0 parts by mass to 10 parts by mass. Moreover, an amount of the compound group (E) is preferably 12 parts by mass to 20 parts by mass, and an amount of the compound group (F) is preferably 5 parts by mass to 20 parts by mass, when a total amount of the monomer components is 100 parts by mass.

<<Colorant>>

The ink of the present invention may be made as a clear ink without a colorant, or may be made as a color ink with the colorant, depending on the intended purpose. It is preferred that the materials having less tint be used other than the aforementioned or below-mentioned colorant, when the ink is made as a non-colored transparent clear ink, or when it is desired to maintain a color tone of the colorant per se as much as possible.

When the colorant is contained in the ink of the present invention, such colorant can be appropriately selected from conventional inorganic pigments and organic pigments, and examples thereof include various color pigments, such as a conventional black pigment, yellow pigment, magenta pigment, cyan pigment, and white pigment. These may be used alone, or in combination.

Examples of the black pigment include carbon black produced by a furnace method of a channel method.

Examples of the yellow pigment include pigments of Pigment Yellow series, such as Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, and Pigment Yellow 180.

Examples of the magenta pigment include pigments of Pigment Red series, such as Pigment Red 5, Pigment Red 7, Pigment Red 12, Pigment Red 48(Ca), Pigment Red 48(Mn), Pigment Red 57(Ca), Pigment Red 57:1, Pigment Red 112, Pigment Red 122, Pigment Red 123, Pigment Red 168, Pigment Red 184, Pigment Red 202, and Pigment Violet 19.

Examples of the cyan pigment include pigments of Pigment Blue series, such as Pigment Blue 1, Pigment Blue 2, Pigment Blue 3, Pigment Blue 15, Pigment Blue 15:3, Pigment Blue 15:4, Pigment Blue 16, Pigment Blue 22, Pigment Blue 60, Vat Blue 4, and Vat Blue 60.

Examples of the white pigment include: sulfuric acid salts of alkaline earth metals such as barium sulfate; carbonic acid salts of alkaline earth metals such as calcium carbonate; silica such as fine silicic acid powder and synthetic silicic acid salts; calcium silicate; alumina; alumina hydrate; titanium oxide; zinc oxide; talc; and clay.

In addition, various inorganic or organic pigments may be optionally used considering, for example, physical properties of the ink.

Further, in the ink of the present invention, a polymerization inhibitor (e.g., 4-methoxy-1-naphthol, methylhydroquinone, hydroquinone, t-butylhydroquinone, di-t-butylhydroquinone, methoquinone, 2,2'-dihydroxy-3,3'-di($\alpha$-methylcyclohexyl)-5,5'-dimethyldiphenylmethane, p-benzoquinone, di-t-butyl diphenylamine, and 9,10-di-n-butoxyanthracene, 4,4'-[1,10-dioxo-1,10-decandiylbis(oxy)]bis[2,2,6,6-tetramethyl]-1-piperidinyloxy), a surfactant (e.g., higher fatty acid ester containing polyether, an amino group, a carboxyl group, or a hydroxyl group, a polydimethylsiloxane compound containing, in its side chain or terminal, polyether, an amino group, a carboxyl group, or a hydroxyl group, and a fluoroalkyl compound containing a polyether residue, an amino group, a carboxyl group, and a hydroxyl group), and a polar group-containing polymer pigment dispersing agent may be optionally used.

The physical properties of the ink are preferably matched to the specifications required for an inkjet ejection head for use. Various types of the inkjet ejection head are on the marked from numerous manufacturers, and among them, there are ejection heads that have high ejection performances and can eject an ink of high viscosity, or ejection heads that have a function of adjusting temperature over a wide temperature range. Considering such market trends, the viscosity of the ink is preferably 2 mPa·s to 150 mPa·s, more preferably 5 mPa·s to 18 mPa·s at 25° C. As described above, however, an inkjet ejection head having a function of adjusting temperature can be used. In the case where the viscosity of the ink of the present invention is excessively high at 25° C., the head is appropriately heated to reduce the viscosity of the ink. Assuming that the heating condition is 60° C. in such case, the viscosity of the ink is preferably 2 mPa·s to 20 mPa·s, more preferably 5 mPa·s to 18 mPa·s at 60° C. In view of energy saving or short startup time, it is preferred that the ink be ejected without heating.

A print coated product obtained by using the ink of the present invention has no problem of skin sensitization even when a small amount of the uncured monomer components is remained, and does not cause skin sensitization even when it is touched by hands or fingers. Accordingly, the print coated product is highly safe.

(Ink Cartridge)

The ink cartridge of the present invention contains the ink of the present invention and a container, and may further contain other members, such as an ink bag, if necessary.

The ink of the present invention can be housed in a container, and used as an ink cartridge. With this form, users do not have to directly touch the ink during operations, such as exchange of the ink, and thus there is no concern about staining of their fingers, hands, clothes, etc. In addition, it is possible to prevent interfusion of foreign matter such as dust into the ink.

The container is not particularly limited, and a shape, structure, size, and material thereof can be appropriately selected depending on the intended purpose. As for the container, for example, preferred is a container having an ink bag formed of an aluminum laminate film, or a resin film.

Figure 2:
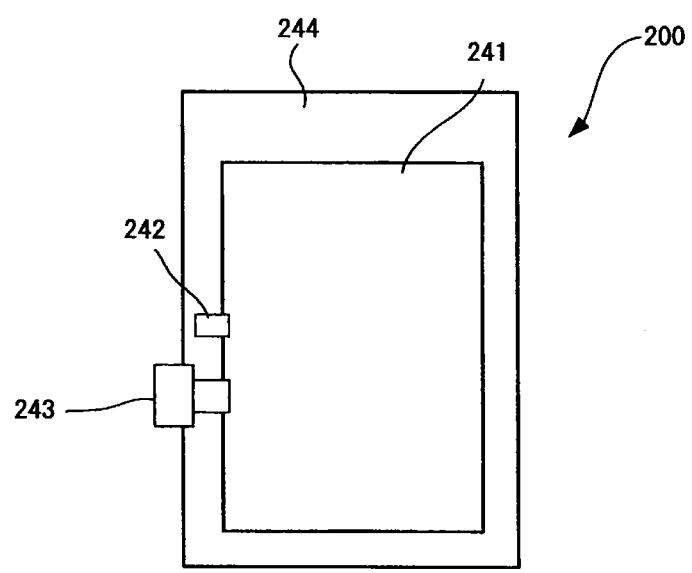
FIG. 2 is a schematic diagram illustrating one example of the ink cartridge of the present invention housing the ink bag.

The ink cartridge will be explained with reference to FIGS. 1 and 2. FIG. 1 is a schematic diagram illustrating one example of an ink bag 241 of the ink cartridge, and FIG. 2 is a schematic diagram illustrating the ink cartridge 200, in which the ink bag 241 of FIG. 1 is housed in a cartridge case 244.

As illustrated in FIG. 1, the ink bag 241 is filled with the ink by injecting the ink from an ink inlet 242. After removal of air present inside the ink bag 241, the ink inlet 242 is sealed by fusion bonding. At the time of use, a needle attached to the main body of the device is inserted into an ink outlet 243 formed of a rubber member to supply the ink to the device therethrough. The ink bag 241 is formed of a wrapping member such as an air non-permeable aluminum laminate film. As illustrated in FIG. 2, the ink bag 241 is typically housed in a plastic cartridge case 244, which is then detachably mounted in various inkjet recording devices to thereby use as the ink cartridge 200.

The ink cartridge of the present invention is preferably detachably mounted in inkjet recording devices. The ink cartridge can simplify the refill and exchange of the ink to improve workability.

(Inkjet Printing Device)

The inkjet printing device of the present invention contains the ink cartridge of the present invention, and may further contain other members.

Figure 3:
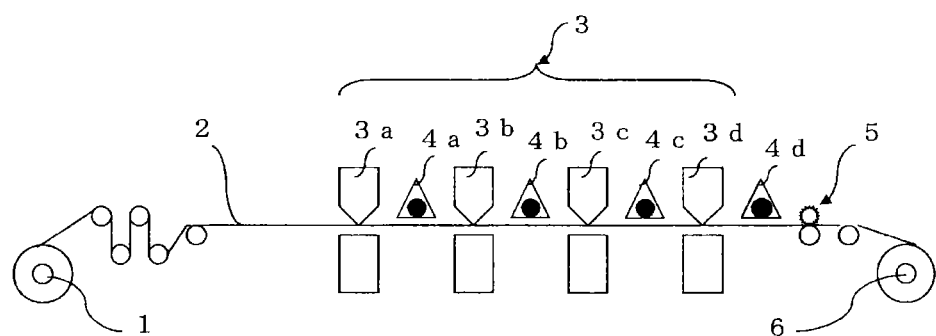
FIG. 3 is a schematic diagram illustrating one example of the inkjet printing device of the present invention.

FIG. 3 is a schematic diagram illustrating one example of the inkjet printing device (printer).

FIG. 3 illustrates an example for forming a color image in the following manner. Specifically, printing units 3 [i.e., printing units 3a, 3b, 3c, and 3e, each of which is for a single color (e.g., yellow, magenta, cyan, or black)] eject color inks (yellow, magenta, cyan, and black) on a print base 2 (which is conveyed from left to right in FIG. 3) from a print base feed roller 1. Every time the inks are ejected, light (UV light) is applied from UV light sources (curing light sources) 4a, 4b, 4c, and 4d to the corresponding color inks for curing, to thereby form a color image. Each of the printing units 3a, 3b, 3c, and 3d has a heating system for heat the ink to make the ink liquidized at a portion where the ink is ejected, and a cooling system which optionally cool the base to about room temperature in a contact or non-contact manner at a base holding portion (i.e., a portion above or under the base in FIG. 3). In the case where the printing area of the previously printed color is small and the conveyance speed of the base is slow, the base is naturally cooled and kept at about room temperature for the color ink subsequent printed. In the case where the printing area of the previously printed color is large and the conveyance speed of the base is fast, however, the temperature of the base is increased. Therefore, it is preferred that the cooling system for maintaining the temperature of the base to about room temperature be optionally provided.

As for the printing base 2, for example, paper, a film, metal, or a composite material thereof is used.

Moreover, FIG. 3 illustrates an embodiment that the printing base 2 is a roll, but the printing base 2 may be a sheet. In addition, the base may be subjected to double-side printing, as well as single-side printing.

When UV rays are applied to each of the color inks for every printing process, the color inks are satisfactorily cured. In order to achieve high-speed printing, the UV light sources 4a, 4b and 4c may be lowered in output power or may be omitted, so that the UV light source 4d is made to apply a sufficient dose of UV rays to a composite printed image formed of a plurality of colors. In addition, for realizing energy saving and cost reduction, LED light sources, which have recently been used practically for printing of photopolymerizable inks, may be used instead of conventionally used light sources such as high-pressure mercury lamps and metal halide lamps.

In FIG. 3, reference numeral 5 denotes a processing unit and reference numeral 6 denotes a wind-up roll for printed products. Although it is not illustrated in FIG. 3, the ink cartridge is housed in each of the printing units to stably supply the ink during printing.

As for a coating base for the ink of the present invention, paper, plastic, metal, ceramic, glass, or a composite material thereof is used. Since an absorbent base, such as wood free paper, can expect an effect of penetrating and drying, it is practical to use an aqueous ink or an oil ink, which is not a quick-drying ink, for such base. On the other hand, it is practical to use a quick-drying ink for a non-absorbent base, such as gloss coat paper, a plastic film, a plastic molded article, ceramic, glass, and metal. For such base, the ink of the present invention is preferably used, as the ink of the present invention is immediately cured upon application of light.

The ink of the present invention is particularly suitably used for such non-absorbent base. Among the non-absorbent bases, the ink of the present invention is suitably used for a plastic material, such as a plastic film, and a plastic molded article, which is formed of polyethylene, polypropylene, polyethylene terephthalate, polycarbonate, an ABS resin, polyvinyl chloride, polystyrene, any of other polyesters, polyamide, a vinyl-based material, or a composite material thereof. For the purpose of activating a surface to improve adhesion, the plastic material is often subjected to a corona treatment. Even after performing such treatment, it is generally difficult to form an image or a coating film and to exhibit excellent adhesion thereon, because the plastic material has less polar groups on the surface thereof compared to paper, metal, ceramic or glass, and is inactive. However, the ink of the present invention can form an image or coating film and exhibit excellent adhesion on a surface of the plastic material.

Moreover, it is preferred that the image or coating film formed on the plastic material have sufficient strength, depending on use. In the case where a thin plastic material, such as the film, is used as the plastic material, it is expected that a process for bending the material is performed after forming an image or a coating film thereon. In such case, it is more preferred that the cured ink have flexibility so that the cured ink can correspond to the deformation of the coating base.

EXAMPLES

Examples of the present invention will be explained hereinafter, but Examples shall not be construed as to limit the scope of the present invention.

<Evaluation Method of SI Value>

According to the skin sensitization test based on the LLNA (Local Lymph Node Assay), the SI value was measured in the manner described below.

[Test Material]

<<Positive Control>>

α-Hexylcinnamaldehyde (HCA; product of Wako Pure Chemical Industries, Ltd.) was used as the positive control.

<<Vehicle>>

As a vehicle, a mixture containing acetone (product of Wako Pure Chemical Industries, Ltd.) and olive oil (product of Fudimi Pharmaceutical Co., Ltd.) in a volume ratio of 4/1 was used.

<<Animals Used>>

Before treated with the test substances, the positive control or the vehicle control, female mice were acclimated for 8 days including 6-day quarantine. No abnormalities were found in all the mice (used animals) during the quarantine/acclimation period.

Based on the body weights measured 2 days before the initiation of sensitization, they were categorized into 2 groups (4 mice/group) by the body weight stratified random sampling method so that the body weight of each individual was within ±20% of the average body weight of all the individuals. Each of the used animals was 8 weeks old to 9 weeks old at the time of the initiation of sensitization. The individuals remaining after the categorization were excluded from the test.

The used animals were individually identified by application of oil ink to their tale throughout the test period, and also their cages were labeled for identification.

<<Housing Environment>>

Throughout the housing period including the quarantine/acclimation period, the used animals were housed in an animal room with barrier system, which was set as follows: 21° C. to 25° C. in temperature, 40% to 70% in relative humidity, 10 times/hour to 15 times/hour in frequency of air circulation, and a 12 hour-interval lighting cycle (lighting from 7:00 to 19:00).

The housing cages used were those made of polycarbonate, and four animals were housed in each cage.

The used animals were given ad libitum solid feed for laboratory animals MF (product of Oriental Yeast Co., Ltd.). Also, using a water-supply bottle, the used animals were given ad libitum tap water in which sodium hypochlorite (PURELOX, product of OYALOX Co., Ltd.) had been added so that the chlorine concentration was about 5 ppm. Bedding used was SUNFLAKE (fir tree, shavings obtained with a power planer) (product of Charles River Inc.). The feed and all of the feeding equipments were sterilized with an autoclave (121° C., 30 min) before use.

The housing cage and the bedding were replaced with new ones at the times of the categorization and the removal of the auricular lymph node (i.e., the time when the animals were transferred from the animal room), and the water-supply bottle and rack were replaced with new ones at the time of the categorization.

[Test Method]

<<Group Composition>>

The group compositions of the vehicle control group and positive control group used for the measurement of the Si value are shown in Table 1.

TABLE 1

| Test group | Sensitization substance | Sensitization dose (µL/auricle) | Times of sensitization | Number of animals (animal No.) |
|---|---|---|---|---|
| Vehicle control group | Vehicle only | 25 | Once/day × 3 days | 4 (1-4) |
| Positive control group | 25.0% HCA | 25 | Once/day × 3 days | 4 (5-8) |

In Table 1, "25.0% HCA" denotes the vehicle containing 25.0% by mass of HCA.

[Preparation]

<<Test Substance>>

Table 2 shows the amount of the test substance. The test substance was weighed in a measuring flask, and the volume of the test substance was adjusted to 1 mL with the vehicle. The thus-prepared test substance preparation was placed in a light-shielded airtight container (made of glass).

TABLE 2

| | Concentration after adjustment (w/v %) | Mass of test substance (g) |
|---|---|---|
| Test substance | 50.0 | 0.5 |

<<Positive Control Substance>>

About 0.25 g of HCA was accurately weighed, and the vehicle was added to the HCA to have the volume of 1 mL, to thereby prepare a 25.0% by mass solution. The thus-prepared positive control substance preparation was placed in a light-shielded airtight container (made of glass).

<<BrdU>>

In a measuring flask, 200 mg of 5-bromo-2'-deoxyuridine (BrdU, product of NACALAI TESQUE, INC.) was accurately weighed in a measuring flask. Then, physiological saline (product of OTSUKA PHARMACEUTICAL CO., LTD.) was added to the measuring flask, and dissolved through application of ultrasonic waves. Thereafter, the volume of the resultant solution was adjusted to 20 mL to prepare a 10 mg/mL solution (BrdU preparation). The BrdU preparation was sterilized through filtration with a sterilized filtration filter and placed in a sterilized container.

<<Preparation Day and Storage Period>>

The positive control preparation was prepared on the day before the initiation of sensitization, and stored in a cold place except in use. The vehicle and the test substance preparations were prepared on the day of sensitization. The BrdU preparation was prepared 2 days before administration and stored in a cold place until the day of administration.

[Sensitization and Administration of BrdU]

<<Sensitization>>

Each (25 µL) of the test substance preparations, the positive control preparation or the vehicle was applied to both the auricles of each of the used animals using a micropipetter. This treatment was performed once a day for three consecutive days.

<<Administration of BrdU>>

About 48 hours after the final sensitization, the BrdU preparation (0.5 mL) was intraperitoneally administered once to each of the used animals.

[Observation and Examination]

<<General Conditions>>

All the used animals used for the test were observed once or more times a day from the day of the initiation of sensitization to the day of the removal of the auricular lymph node (i.e., the day when the animals were transferred from the animal room). Notably, the observation day was counted from the day of the initiation of sensitization being regarded as Day 1.

<<Measurement of Body Weights>>

The body weight of each of the used animals was measured on the day of the initiation of sensitization and on the day of the removal of the auricular lymph node (i.e., the day when the animals were transferred from the animal room). Also, the average of the body weights and the standard error thereof were calculated for each group.

<<Removal of Auricular Lymph Node and Measurement of Weight Thereof>>

About 24 hours after the administration of BrdU, the used animals were allowed to undergo euthanasia, and their auricular lymph nodes were sampled. The surrounding tissue of each auricular lymph node was removed, and the auricular lymph nodes from both the auricles were collectively weighed. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.

<<Measurement of BrdU Intake>>

After returning the auricular lymph nodes to room temperature, the auricular lymph nodes were mashed with the gradual addition of physiological saline, and suspended therein. The thus-obtained suspension was filtrated and then dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.

[Evaluation of Results]

<<Calculation of Stimulation Index (SI)>>

As shown in the following formula, the measurement of BrdU intake for each individual was divided by the average of the measurements of BrdU intake in the vehicle control group to calculate the SI value for the individual. The SI value of each test group was the average of the SI values of the individuals. Also, the standard error of the SI values was calculated for each test group. Notably, the SI value was rounded at the second decimal place and shown to the first decimal place.

$$SI = \frac{\text{Average of measurements of } BrdU \text{ intake for each individual } (\text{average of } 3 \text{ wells})}{\text{Average of measurements of } BrdU \text{ intake in the vehicle control group (average of 4 animals)}}$$

Examples 1 to 37

Comparative Examples 1 to 2

The following materials (A) to (F) were mixed with a blending ratio (a unit for the value was parts by mass) as depicted in each column of Examples and Comparative Examples of Tables 3 to 6, to thereby obtain an ink.

(A) t-butyl methacrylate, n-pentyl methacrylate, and n-hexyl methacrylate that are monomers negative for skin sensitization (B) glycerol dimethacrylate that is a monomer negative for skin sensitization (C) tricyclodecane dimethanol dimethacrylate that is a monomer negative for skin sensitization (D) isostearyl acrylate, stearyl methacrylate, and ethylene oxide-modified phenol acrylate that are monomers negative for skin sensitization (E) a photoradical polymerization initiator negative skin sensitization (F) a polymer or copolymer of styrene, styrene derivative, acrylic acid ester, or acrylic acid, or any combination thereof.

In Tables 3 to 6, the details of A1 to A3, B, C, D1 to D3, E1 to E3, and F1 to F4 are as follows. The value in parentheses at the end is an "SI" value as measured by the LLNA test described in the above skin sensitization evaluation (1). Moreover, the description "negative" or "no" in parentheses at the end means that the product is evaluated as "negative for skin sensitization" or "no skin sensitization" in the MSDS (Material Safety Data Sheet) described in the above skin sensitization evaluation (2).

The evaluation method of the SI value is as described above.

A1: t-butyl methacrylate, "Acryl Ester TB" manufactured by Mitsubishi Rayon Co., Ltd., (negative), evaluation in the literature (test method: maximization test)

A2: n-pentyl methacrylate, "n-Amyl Methacrylate" manufactured by Toyo Science Corporation, (negative), evaluation in the literature (test method: maximization test)

A3: n-hexyl methacrylate, "n-Hexyl Methacrylate" manufactured by Tokyo Chemical Industry Co., Ltd., (negative), evaluation in the literature (test method: maximization test)

B: glycerol dimethacrylate, "701" manufactured by Shin-Nakamura Chemical Co., Ltd., (1.2)

C: tricyclodecane dimethanol dimethacrylate, "DCP" manufactured by Shin-Nakamura Chemical Co., Ltd., (1.3)

D1: isostearyl acrylate, "S1800A" manufactured by Shin-Nakamura Chemical Co., Ltd., (1.4)

D2: stearyl methacrylate, "S" manufactured by Shin-Nakamura Chemical Co., Ltd., (1.2)

D3: ethylene oxide-modified phenol acrylate, "M120" manufactured by Toagosei Chemical CO., LTD., (0.7)

E1: 1-hydroxy-cyclohexylphenyl ketone, (no), evaluated in MSDS (test method: OECD test guideline 406)

E2: 2-dimethylamino-2-(4-methylbenzyl)-1-(4-morpholin-4-yl-phenyl)butan-1-one, (no), evaluated in MSDS (test method: OECD test guideline 406)

E3: 2,4-diethylthioxanthone (1.4), and 2-ethylhexyl p-dimethylaminobenzoate, (no) evaluated in MSDS (test method: OECD test guideline 406)

F1: Styrene-acrylic acid-α-methylstyrene copolymer, having an acid value of 108 mgKOH/g and the weight average molecular weight of 4,600

F2: Styrene-acrylic acid-α-methylstyrene copolymer, having an acid value of 53 mgKOH/g and the weight average molecular weight of 8,100

F3: Polystyrene having the weight average molecular weight of 4,400

F4: Polymethyl methacrylate having the weight average molecular weight of 36,000

Each ink was evaluated in terms of the viscosity (mPa·s) at 25° C. and the adhesion of the cured coating film thereof to the base. The results are presented in Tables 3 to 6.

The viscosity of each ink was measured by a cone plate-type rotary viscometer (manufactured by TOKI SANGYO CO., LTD.) with the temperature of circulating water being constantly set 25° C. The temperature of 25° C. is temperature set considering typical room temperature.

As for the evaluation of the adhesion of the cured coating film of each ink to the base, a commercially available polypropylene film (P2161, manufactured by TOYOBO CO., LTD., thickness: 60 μm) and polyethylene terephthalate film (E5100, manufactured by TOYOBO CO., LTD., thickness: 100 μm) were used as a general film material widely used as a wrapping material or industrial material. After ejecting the ink onto a corona-treated surface of any of these films, light was applied from a UV irradiating device LH6 (manufactured by Fusion Systems Japan Co., Ltd.) to cure the ink to prepare a solid coating film. The adhesion of the solid coating film was evaluated by a cross-cut method specified in JIS-K-5600-5-6. The case where peeling of the ink was not observed and the case where only a small peel was observed at the cross-section of the cut were evaluated as "A," the case where peeling of the ink was slightly observed and the case where a peel was observed only at the cross-section of the cut were evaluated as "B," and the case where peeling of the ink was clearly observed was evaluated as "C."

Specifically, an aluminum pouch bag having a shape illustrated in FIG. 1 was charged with each ink, and hermetically sealed so as to avoid inclusion of air bubbles. The hermetically sealed pouch bag containing the ink was housed in a plastic cartridge as illustrated in FIG. 2. This cartridge was mounted in a casing adapted for housing it. In the casing, an ink flow channel was provided from the cartridge to a GEN4 head (product of Ricoh Printing Systems, Ltd.). The ink was jetted through the ink flow channel to form, on the base, a solid coating film. Note that, the jet amount of the ink droplet was adjusted so that a thickness of the solid coating film was to be about 10 μm.

The solid printed coating film was cured by means of the UV irradiating device LH6 under the light dose conditions of 0.2 (mW/cm$^2$) and 400 (mJ/cm$^2$), and the resultant was provided for the evaluation of adhesion.

TABLE 3

| Material | | Ex. 1 | Ex. 2 | Ex. 3 | Ex. 4 | Comp. Ex. 1 | Ex. 5 | Ex. 6 | Ex. 7 |
|---|---|---|---|---|---|---|---|---|---|
| A | A1 | 70 | 70 | 70 | 70 | 70 | 40 | 70 | 70 |
|   | A2 | | | | | | | | |
|   | A3 | | | | | | | | |
| B |   | 30 | 30 | 30 | 30 | 30 | 60 | 30 | 30 |
| C |   | | | | | | | | |
| D | D1 | | | | | | | | |
|   | D2 | | | | | | | | |
|   | D3 | | | | | | | | |
| E | E1 | | | | | | | | |
|   | E2 | 12 | 12 | 12 | 12 | 12 | 12 | 12 | 12 |
|   | E3 | | | | | | | | |
| F | F1 | 12 | 10 | 8 | 5 | | 8 | | |
|   | F2 | | | | | | | 12 | 8 |
|   | F3 | | | | | | | | |
|   | F4 | | | | | | | | |
| Viscosity at 25° C. | | 9 | 7 | 6 | 4 | 2 | 15 | 13 | 10 |
| Adhesion to polypropylene | | A | A | A | A | C | A | A | A |
| Adhesion to polyethylene terephthalate | | A | A | A | B | C | A | A | A |

| Material | | Ex. 8 | Ex. 9 | Ex. 10 | Ex. 11 | Ex. 12 | Ex. 13 |
|---|---|---|---|---|---|---|---|
| A | A1 | 70 | 70 | 70 | 85 | 70 | 70 |
|   | A2 | | | | | | |
|   | A3 | | | | | | |
| B |   | | 30 | 30 | 30 | 15 | 30 | 30 |
| C |   | | | | | | |
| D | D1 | | | | | | |
|   | D2 | | | | | | |
|   | D3 | | | | | | |
| E | E1 | | | | | | |
|   | E2 | 12 | 12 | 12 | 12 | 12 | 12 |
|   | E3 | | | | | | |
| F | F1 | | | | | | |
|   | F2 | | | | | | |
|   | F3 | 20 | 12 | 8 | | | |
|   | F4 | | | | 12 | 10 | 8 |
| Viscosity at 25° C. | | 15 | 6 | 5 | 14 | 15 | 9 |
| Adhesion to polypropylene | | A | A | A | A | A | A |
| Adhesion to polyethylene terephthalate | | A | A | B | A | B | B |

TABLE 4

| Material | | Ex. 1 | Ex. 14 | Comp. Ex. 2 |
|---|---|---|---|---|
| A | A1 | 70 | 70 | 70 |
|   | A2 | | | |
|   | A3 | | | |
| B |   | 30 | 10 | |
| C |   | | 20 | 30 |
| D | D1 | | | |
|   | D2 | | | |
|   | D3 | | | |
| E | E1 | | | |
|   | E2 | 12 | 12 | 12 |
|   | E3 | | | |
| F | F1 | 12 | 12 | 12 |
|   | F2 | | | |
|   | F3 | | | |
|   | F4 | | | |
| Viscosity at 25° C. | | 9 | 10 | 10 |
| Adhesion to polypropylene | | A | A | C |
| Adhesion to polyethylene terephthalate | | A | A | C |
| Pencil hardness of coating film | | F | H | H |

TABLE 5

| Material | | Ex. 1 | Ex. 15 | Ex. 16 | Ex. 17 | Ex. 18 | Ex. 19 | Ex. 20 |
|---|---|---|---|---|---|---|---|---|
| A | A1 | 70 | 65 | 60 | 65 | 60 | 65 | 60 |
|   | A2 | | | | | | | |
|   | A3 | | | | | | | |
| B |   | 30 | 30 | 30 | 30 | 30 | 30 | 30 |
| C |   | | | | | | | |
| D | D1 | | 5 | 10 | | | | |
|   | D2 | | | | 5 | 10 | | |
|   | D3 | | | | | | 5 | 10 |
| E | E1 | | | | | | | |
|   | E2 | 12 | 12 | 12 | 12 | 12 | 12 | 12 |
|   | E3 | | | | | | | |
| F | F1 | 12 | 12 | 12 | 12 | 12 | 12 | 12 |
|   | F2 | | | | | | | |
|   | F3 | | | | | | | |
|   | F4 | | | | | | | |
| Viscosity at 25° C. | | 9 | 10 | 11 | 10 | 11 | 11 | 12 |
| Adhesion to polypropylene | | A | A | A | A | A | A | A |
| Adhesion to polyethylene terephthalate | | A | A | B | A | A | A | B |
| Flexibility of coating film | | B | A | A | A | A | A | A |

| Material | | Ex. 21 | Ex. 22 | Ex. 23 | Ex. 24 | Ex. 25 | Ex. 26 |
|---|---|---|---|---|---|---|---|
| A | A1 | 65 | 60 | 65 | 60 | 65 | 60 |
|   | A2 | | | | | | |
|   | A3 | | | | | | |
| B |   | 10 | 10 | 10 | 10 | 10 | 10 |
| C |   | 20 | 20 | 20 | 20 | 20 | 20 |
| D | D1 | 5 | 10 | | | | |
|   | D2 | | | 5 | 10 | | |
|   | D3 | | | | | 5 | 10 |
| E | E1 | | | | | | |
|   | E2 | 12 | 12 | 12 | 12 | 12 | 12 |
|   | E3 | | | | | | |
| F | F1 | 12 | 12 | 12 | 12 | 12 | 12 |
|   | F2 | | | | | | |
|   | F3 | | | | | | |
|   | F4 | | | | | | |
| Viscosity at 25° C. | | 11 | 12 | 11 | 12 | 12 | 13 |
| Adhesion to polypropylene | | A | A | A | A | A | A |
| Adhesion to polyethylene terephthalate | | A | B | A | A | A | B |

TABLE 5-continued

| | | | | | | |
|---|---|---|---|---|---|---|
| Flexibility of coating film | A | A | A | A | A | A |

TABLE 6

| Material | | Ex. 1 | Ex. 27 | Ex. 28 | Ex. 29 | Ex. 30 | Ex. 31 |
|---|---|---|---|---|---|---|---|
| A | A1 | 70 | | | 30 | 70 | 70 |
| | A2 | | 70 | | 20 | | |
| | A3 | | | 70 | 20 | | |
| B | | 30 | 30 | 30 | 30 | 30 | 30 |
| C | | | | | | | |
| D | D1 | | | | | | |
| | D2 | | | | | | |
| | D3 | | | | | | |
| E | E1 | | | | | 15 | 10 |
| | E2 | 12 | 12 | 12 | 12 | | |
| | E3 | | | | | | 10 |
| F | F1 | 12 | 12 | 12 | 12 | 12 | 12 |
| | F2 | | | | | | |
| | F3 | | | | | | |
| | F4 | | | | | | |
| Carbon black *1 | | | | | | | |
| Viscosity at 25° C. | | 9 | 12 | 14 | 12 | 8 | 8 |
| Adhesion to polypropylene | | A | A | A | A | A | A |
| Adhesion to polyethylene terephthalate | | A | A | A | A | A | A |

| Material | | Ex. 32 | Ex. 33 | Ex. 34 | Ex. 35 | Ex. 36 | Ex. 37 |
|---|---|---|---|---|---|---|---|
| A | A1 | 70 | 70 | 70 | 70 | 70 | 85 |
| | A2 | | | | | | |
| | A3 | | | | | | |
| B | | 30 | 10 | 10 | 10 | 10 | 10 |
| C | | | 20 | 20 | 20 | 20 | 5 |
| D | D1 | | | | | | |
| | D2 | | | | | | |
| | D3 | | | | | | |
| E | E1 | | | | | | |
| | E2 | 12 | 12 | 12 | 12 | 12 | 12 |
| | E3 | | | | | | |
| F | F1 | 12 | 12 | | 6 | | |
| | F2 | | | 12 | | | |
| | F3 | | | | | 12 | |
| | F4 | | | | 6 | | 12 |
| Carbon black *1 | | 4 | 4 | 4 | 4 | 4 | 4 |
| Viscosity at 25° C. | | 11 | 11 | 15 | 8 | 15 | 14 |
| Adhesion to polypropylene | | A | A | A | A | A | A |
| Adhesion to polyethylene terephthalate | | A | A | A | A | B | B |

*1 Carbon black containing carbon black "#10" manufactured by Mitsubishi Chemical Corporation and a dispersing agent "Solsperse39000" manufactured by Lubrizol Japan Co., with the mass ratio of 3/1.

It could be confirmed from Examples that the monomer components needed to contain at least t-butyl methacrylate, n-pentyl methacrylate, or n-hexyl methacrylate, or any combination thereof to provide an inkjet ink having no problem of skin sensitization, and a sufficiently low viscosity so as not to cause any problem in ink jetting. Note that, use of n-butyl methacrylate, which had the similar molecular structure to the structures of the aforementioned monomers, as the monomer component caused a problem of skin sensitization, through there was not problem in ink jetting.

As seen from the results of Examples 1 to 4, excellent adhesion to the polypropylene film or polyethylene terephthalate film could be achieved by using the monomers of (A) and (B) in combination as the monomer components. However, there was a case excellent adhesion to the polyethylene terephthalate film could not be obtained depending on the amount of the polymer component (F). Accordingly, it is necessary to appropriately adjust the amount of the polymer component (F) considering various physical properties of the ink or the coating film as required, as well as the adhesion.

Moreover, the viscosity increases as the amount of the polymer component (F) increases. Accordingly, the amount thereof needs to be set to give a viscosity fall in the range with which the ink can be ejected, considering an ejection head use, ejection force thereof, or heating specifications.

As in Comparative Example 1, on the other hand, sufficient adhesion could not be obtained when the polymer component (F) was not contained.

As seen from the results of Examples 3 and 5, the viscosity of the ink could be controlled with maintaining the adhesion by controlling the blending ratio of (A) and (B). Since the viscosity required for the ink varies depending on properties of an ejection head, the viscosity thereof can be appropriately adjusted depending on such circumstances.

As seen from the results of Examples 6 to 13, excellent adhesion could be similarly achieved by using the different polymer component. However, there was also a case where excellent adhesion to the polyethylene terephthalate film could not be attained depending on a type or amount of the polymer component. Accordingly, it is necessary to appropriately select a type or amount of the polymer component (polymer or copolymer) considering various physical properties of the ink or coating film as required as well as the adhesion. As seen especially from the results of Examples 11 to 13, it was possible to lower the viscosity of the ink with the adjustment of the blending ratio of the monomer component. As a result, the polymer component of a large molecular weight can be also contained in a necessary amount.

As seen from the results of Examples 1 and 14, the strength of the coating film could be improved, as well as the adhesion, by adjusting the blending ratio of the monomer components (A) and (B), and using the monomer component (C) in combination. As seen from the results of Comparative Example 2, on the other hand, sufficient adhesion could not be attained when the monomer component (B) was not contained. In order to prevent variations in results of pencil hardness of the coating films due to the superiority or inferiority of the adhesion, scratch hardness of the coating film was evaluated in the following manner. A coating film was formed on a commercially available polyethylene terephthalate film (COSMOSHINE A4300, manufactured by TOYOBO CO., LTD.; thickness: 188 μm), at a surface of which an adhesion assisting layer had been provided in advance, under the same conditions as described above, and scratch hardness of the resulting coating film was evaluated in accordance with a pencil method specified in JIS-K-5600-5-4. The pencil hardness is determined as H, and F in this order from the hardest.

As seen from the results of Examples 15 to 26, the flexibility of the coating film could be improved by adding the monomer component (D) to the ink. Based on this, the amount of the monomer component can be appropriately adjusted considering various physical properties of the ink or the coating film as required, as well as the adhesion or flexibility. Note that, the "flexibility of the coating film" mentioned here was evaluated by bending the coating film formed on the polypropylene film in the aforementioned manner, together with the base, inwards and outwards until a line of flexion appeared, and visually observing whether or not the coating film could correspond the movements of bending. "B" indicates that a crack was formed in the coating film, and "A" indicates that no crack was formed in the coating film.

As seen from the results of Examples 1 and 27 to 29, excellent adhesion could be achieved even when a type of the monomer of (A) was changed. Accordingly, the monomers of A1 to A3 can be appropriately selected considering various physical properties of the ink or coating film as required, as well as the adhesion.

As seen from the results of Examples 1, 30, and 31, excellent adhesion could be achieved even when a type of the polymerization initiator of (E) for use was changed. Accordingly, the polymerization initiators E1 to E3 can be appropriately selected considering various physical properties of the ink or coating film as required, as well as the adhesion.

As seen from the results of Examples 32 to 37, excellent adhesion could be achieved even when the ink contained a colorant. Note that, the polymer F4 is a polymer which largely increases viscosity of an ink as contained, comparing to other polymers. As in Example 37, however, the viscosity of the ink could be reduced to the range with which the ink could be ejected, by adjusting the blending ratio of the monomer component. As in Examples 33 to 37, moreover, excellent adhesion could be similarly achieved even when the different polymer component was used. However, there was a case where excellent adhesion to the polyethylene terephthalate film could not be attained depending on a type or an amount of the polymer component. Accordingly, it is necessary to appropriately select a type or an amount of the polymer component considering various physical properties of the ink or coating film as required, as well as the adhesion.

Note that, in all of Examples, the coating films after the application of light were cured excellently without tackiness, as confirmed by touching with fingers.

The embodiments of the present invention are as follows:

<1> A photopolymerizable inkjet ink, containing:
  monomer components; and
  a polymer or a copolymer of styrene, styrene derivative, acrylic acid ester, or acrylic acid, or any combination thereof,
  wherein the monomer components contain:
  t-butyl methacrylate, n-pentyl methacrylate, or n-hexyl methacrylate, or any combination thereof; and
  glycerol dimethacrylate, and
  wherein the photopolymerizable inkjet ink is free from a diluting solvent.

<2> The photopolymerizable inkjet ink according to <1>, wherein an amount of the polymer or the copolymer is 5 parts by mass to 20 parts by mass relative to 100 parts by mass of the monomer components.

<3> The photopolymerizable inkjet ink according to any of <1> or <2>, wherein an amount of the t-butyl methacrylate, the n-pentyl methacrylate, or the n-hexyl methacrylate, or any combination thereof in 100 parts by mass of the monomer components is 20 parts by mass to 85 parts by mass.

<4> The photopolymerizable inkjet ink according to any one of <1> to <3>, wherein the amount of the glycerol dimethacrylate in 100 parts by mass of the monomer components is 10 parts by mass to 60 parts by mass.

<5> The photopolymerizable inkjet ink according to any one of <1> to <4>, wherein the monomer components further contain tricyclodecane dimethanol dimethacrylate.

<6> The photopolymerizable inkjet ink according to any one of <1> to <5>, wherein the monomer components further contain isostearyl acrylate, stearyl methacrylate, or ethylene oxide-modified phenol acrylate, or any combination thereof.

<7> An ink cartridge, containing:
  the photopolymerizable inkjet ink according to any one of <1> to <6>; and
  a container.

<8> An inkjet printing device, containing:
  the ink cartridge according to <7>.

This application claims priority to Japanese application No. 2012-124057, filed on May 31, 2012, and incorporated herein by reference.

What is claimed is:

1. A photopolymerizable inkjet ink, comprising:
  monomer components; and
  a polymer or a copolymer of styrene, styrene derivative, acrylic acid ester, or acrylic acid, or any combination thereof,
  wherein the monomer components comprise:
  t-butyl methacrylate, n-pentyl methacrylate, or n-hexyl methacrylate, or any combination thereof, and
  glycerol dimethacrylate, and
  wherein the photopolymerizable inkjet ink is free from a diluting solvent.

2. The photopolymerizable inkjet ink according to claim 1, wherein an amount of the polymer or the copolymer is 5 parts by mass to 20 parts by mass relative to 100 parts by mass of the monomer components.

3. The photopolymerizable inkjet ink according to claim 1, wherein an amount of the t-butyl methacrylate, the n-pentyl methacrylate, or the n-hexyl methacrylate, or any combination thereof in 100 parts by mass of the monomer components is 20 parts by mass to 85 parts by mass.

4. The photopolymerizable inkjet ink according to claim 1, wherein the amount of the glycerol dimethacrylate in 100 parts by mass of the monomer components is 10 parts by mass to 60 parts by mass.

5. The photopolymerizable inkjet ink according to claim 1, wherein the monomer components further comprise tricyclodecane dimethanol dimethacrylate.

6. The photopolymerizable inkjet ink according to claim 1, wherein the monomer components further comprise isostearyl acrylate, stearyl methacrylate, or ethylene oxide-modified phenol acrylate, or any combination thereof.

7. An ink cartridge, comprising:
  a photopolymerizable inkjet ink; and
  a container,
  wherein the photopolymerizable inkjet ink comprises:
  monomer components; and
  a polymer or a copolymer of styrene, styrene derivative, acrylic acid ester, or acrylic acid, or any combination thereof,
  wherein the monomer components comprise:
  t-butyl methacrylate, n-pentyl methacrylate, or n-hexyl methacrylate, or any combination thereof, and
  glycerol dimethacrylate, and
  wherein the photopolymerizable inkjet ink is free from a diluting solvent.

8. An inkjet printing device, comprising:
  an ink cartridge,
  wherein the ink cartridge comprises a photopolymerizable inkjet ink, and a container,
  wherein the photopolymerizable inkjet ink comprises:
  monomer components; and
  a polymer or a copolymer of styrene, styrene derivative, acrylic acid ester, or acrylic acid, or any combination thereof,
  wherein the monomer components comprise:
  t-butyl methacrylate, n-pentyl methacrylate, or n-hexyl methacrylate, or any combination thereof; and
  glycerol dimethacrylate, and
  wherein the photopolymerizable inkjet ink is free from a diluting solvent.

* * * * *